United States Patent [19]
Shimomura

[11] 4,236,803
[45] Dec. 2, 1980

[54] LENS FOR A CAMERA PROVIDED WITH CODE PATTERNS

[75] Inventor: Jun Shimomura, Tokyo, Japan

[73] Assignee: Nippon Kogaku K.K., Tokyo, Japan

[21] Appl. No.: 56,857

[22] Filed: Jul. 12, 1979

[30] Foreign Application Priority Data

Jul. 12, 1978 [JP] Japan ................... 53/83943
Jul. 12, 1978 [JP] Japan ................... 53/83944

[51] Int. Cl.³ ............... G03B 7/093; G03B 17/00; G03B 17/18
[52] U.S. Cl. ................. 354/286; 354/23 D; 354/289
[58] Field of Search .......... 354/23 D, 50, 51, 234, 354/286, 289

[56] References Cited

U.S. PATENT DOCUMENTS

| | | | |
|---|---|---|---|
| 3,840,289 | 10/1974 | Okuno | 354/289 X |
| 3,928,858 | 12/1975 | Sakurada et al. | 354/23 D |
| 4,104,649 | 8/1978 | Tanaka et al. | 354/289 |

*Primary Examiner*—Michael L. Gellner
*Attorney, Agent, or Firm*—Shapiro and Shapiro

[57] ABSTRACT

A lens information introducing device in a camera comprises n bits of code patterns provided on a lens and photoelectrically legible, optical means for introducing the code patterns into a camera body and imaging the same at a predetermined position, and photoelectric converter means disposed at the predetermined position and having n photoelectric converting elements corresponding to the code patterns and being effective to produce a digital electrical signal corresponding to the lens information on the basis of the photoelectric signals produced by the photoelectric converting elements.

15 Claims, 11 Drawing Figures

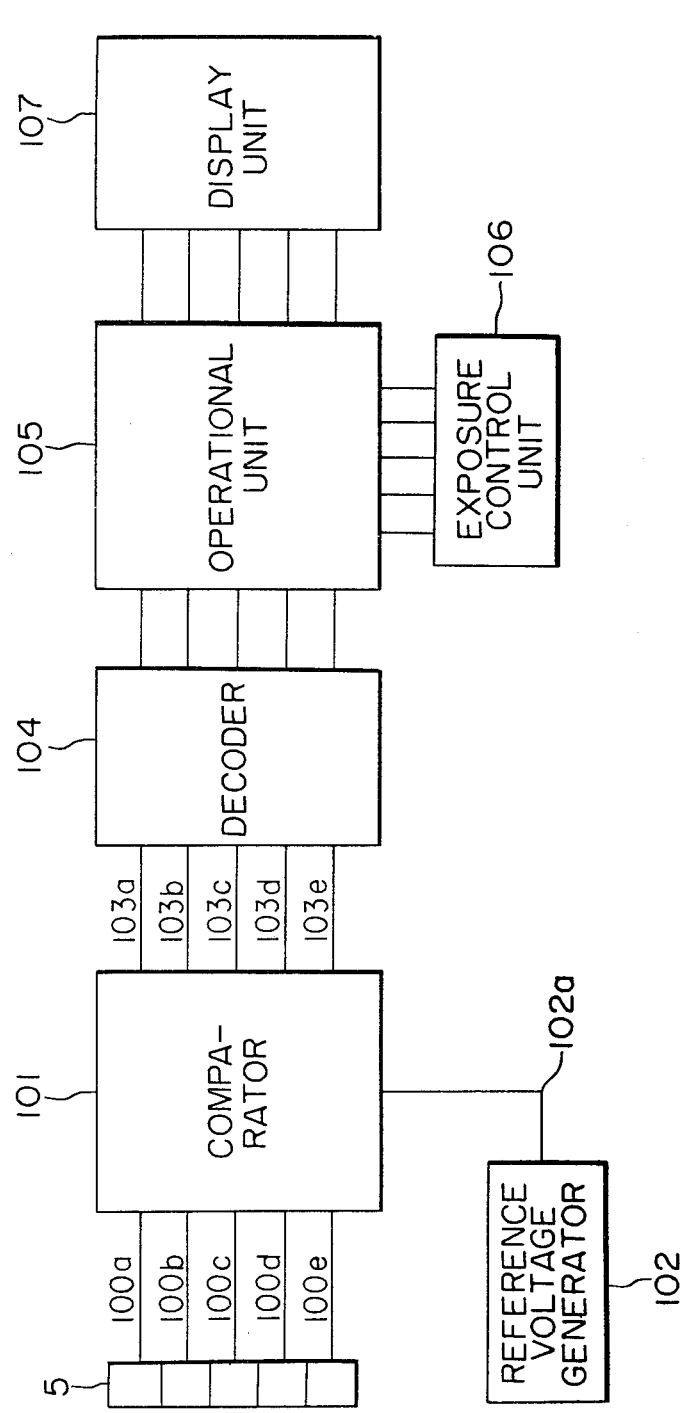
FIG. 3
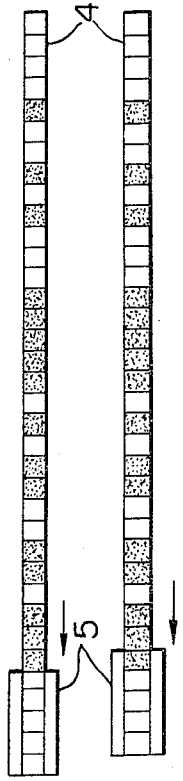
FIG. 4A
FIG. 4B

FIG. 4C  FIG. 4D  FIG. 5
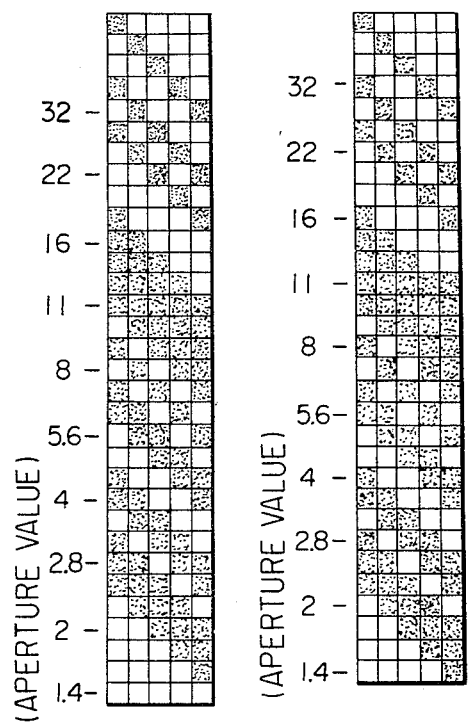
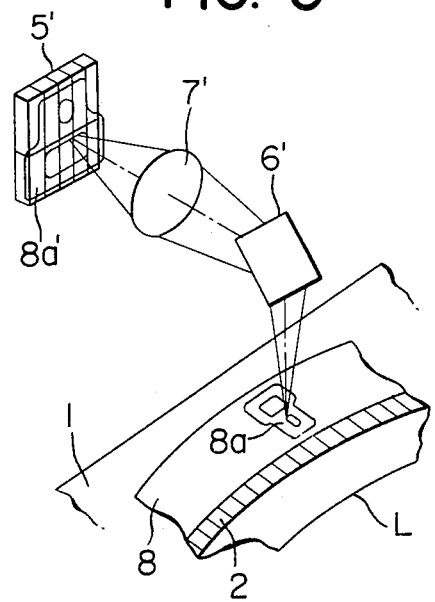
FIG. 6
1.4 2 2.8 4 5.6 8 11
FIG. 7
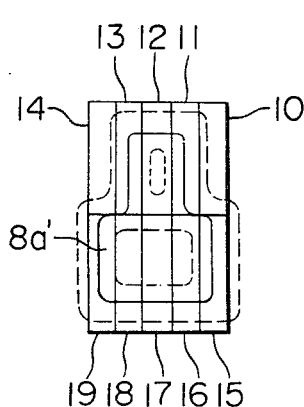
FIG. 8
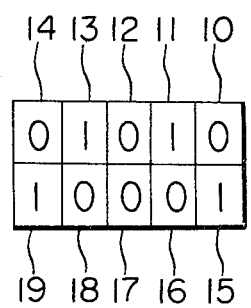

LENS FOR A CAMERA PROVIDED WITH CODE PATTERNS

BACKGROUND OF THE INVENTION

1. Field of the Invention

This invention relates to a lens information introducing device in a camera for transmitting lens information to a camera body.

2. Description of the Prior Art

As the means for suitably quantizing a set value in a lens such as distance, aperture or the like and transmitting the same to a camera body, there is known one in which ON-OFF switches corresponding in number to the number of bits necessary for the transmission of the information are provided on the lens side or the camera body side and are mechanically operated or transmission of the information is carried out by relative movement of a brush contact and a code plate. (Examples of such means are disclosed in U.S. Pat. No. 3,928,858 corresponding to Japanese Laid-Open Patent Application No. 67650/1975 and U.S. Pat. No. 4,104,649 corresponding to Japanese Laid-open Patent Application No. 56926/1977.) However, such means requires many parts such as the brush contact, the code plate, the wiring parts, etc. to be provided in a lens or in a camera and this not only means the necessity of the space therefor but also has a disadvantage that considerable labor and cost are required for the wiring work and the check-up of the electrical reliability thereof.

SUMMARY OF THE INVENTION

It is an object of the present invention to provide a lens information introducing device which is low in cost and high in reliability.

It is another object of the present invention to provide a lens having code patterns as a part of such lens information introducing device, and a camer body having a device for reading the code patterns.

The invention will become fully apparent from the following detailed description of some embodiments thereof taken in conjunction with the accompanying drawings.

BRIEF DESCRIPTION OF THE DRAWINGS

FIG. 3 is a block diagram showing the circuit construction for obtaining the digital signal in the embodiment of FIG. 1.

FIG. 4 shows specific examples of the binary coded code patterns.

FIG. 5 shows another embodiment of the lens information introducing device in a camera provided with the code patterns according to the present invention.

FIG. 6 shows the code patterns in the embodiment shown in FIG. 5.

FIGS. 7 and 8 show the conversion of the code patterns into digital signals.

DESCRIPTION OF THE PREFERRED EMBODIMENTS

Figure 1:
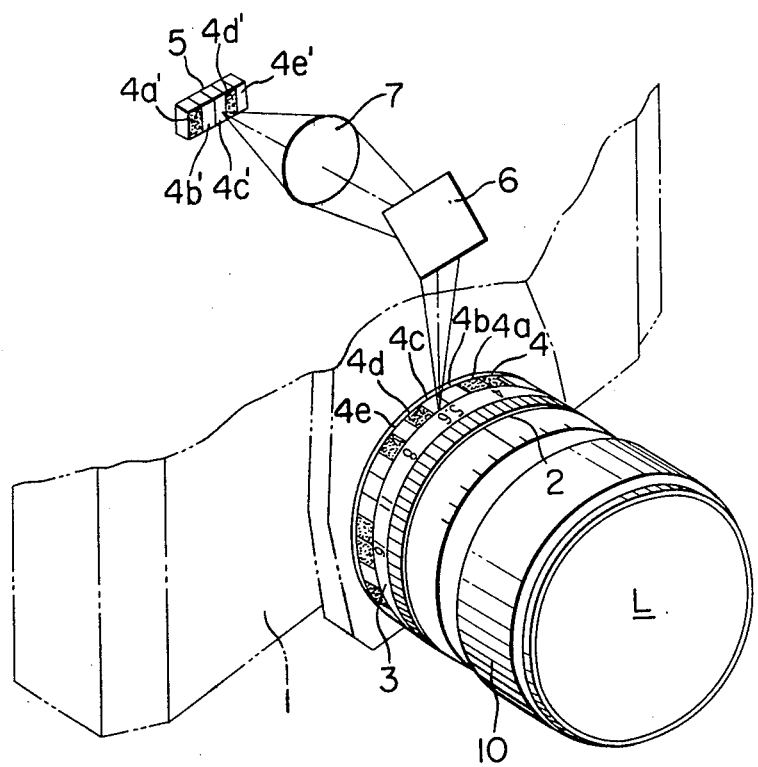
FIG. 1 is a perspective view showing an embodiment of the lens information introducing device in a camera provided with code patterns.
Figure 2:
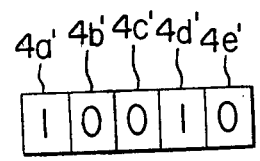
FIG. 2 illustrates a digital signal in the embodiment of FIG. 1.

Referring to FIG. 1, a camera body 1 had a lens L attached thereto, and an aperture ring 2 for setting the aperture value is rotatably supported relative to the camera body. In FIG. 1, an aperture scale 3 and a code pattern 4 for quantizing the aperture information are provided on the outer surface of the aperture ring. The code pattern 4 comprises binary coded stripes of light and dark, and the arrangement of these stripes is such that a set of stripes (in FIG. 1 five stripes) corresponds to an aperture set value, and forms an optical code plate. On the camera body 1, there is provided an optical system for covering the one set of stripes and projecting the conjugate image thereof onto the light-receiving surface of a light-receiving element 5 secured to the camera side. The optical system comprises, for example, an image forming lens 7 provided around an unshown pentaprism and a mirror 6 for bending the light from the code pattern 4 toward the lens 7. The light-receiving element 5 has its light-receiving surface divided into five segments so that five independent sets of photoelectric output signals can be produced from the five segments in accordance with the light and dark of the projected stripes. Designated by 10 is a distance ring. In the condition of FIG. 1, the stripes 4a, 4b, 4c, 4d and 4e of the aperture ring 2 are projected onto the light-receiving surface of the light-receiving element 5 by an optical system 6, 7 to form images 4a', 4b', 4c', 4d' and 4e' of the light and dark stripes which are conjugate therewith. Therefore, by processing the photoelectric outputs of the light-receiving elememt 5, there are obtained digital signals corresponding to these light and dark stripes, namely, signals 1, 0, 0, 1, 0 as shown in FIG. 2.

FIG. 3 shows a circuit for obtaining these digital signals, which are utilized for the exposure control and the display. In FIG. 3, the photoelectric outputs 100a-100e of the light-receiving element 5 are compared with the reference voltage 102a of a reference voltage generating circuit 102 by a comparator circuit 101. As a result, the digital signals as shown in FIG. 2 are obtained as the outputs 103a-103e of the comparator circuit 101. These digital signals 103a-103e are decoded by a decoder 104 and applied to an operational unit 105. The operational unit effects signal processing in accordance with the decoded inputs and other inputs such as, for example, film sensitivity, etc. as is well-known, and produces the result thereof to an exposure control unit 106 and a display unit 107. On the basis of the output of the operational unit, the exposure control unit 106 controls the shutter speed and the display unit 107 effects a predetermined display, for example, the display of the shutter speed controlled. The operational unit 105, the exposure control unit 106 and the display unit 107 may be of the well-known types.

FIGS. 4A and 4B show specific examples of the binary coded code pattern and this code pattern is binary coded into one-track light and dark stripes of the known M-sequences (maximal length sequences: FIG. 4A) and the improved M-sequences (FIG. 4B), respectively. The light-receiving element in the present example receives five bits of the pattern as shown at the block 5 of FIGS. 4A and 4B. The present example is one in which the aperture value is quantized by ⅓ of a step each. That is, in FIG. 1, the light receiving element 5 photoelectrically reads (detects) five bits of light and dark stripes of the code pattern through the optical system 6, 7 and therefore, if the code patterns shown in FIGS. 4A and 4B are moved for one bit each in the direction of arrow correspondingly to the aperture value setting of the aperture ring, the patterns corresponding to the set aperture value are successively detected by the light-receiving element 5 as shown in FIGS. 4C and 4D, respectively. Thus, the aperture value quantized by ⅓ of a step each is transmitted to the camera body side.

The code patterns of the M-sequences and the improved M-sequences shown in FIGS. 4A and 4B, with the binary code pattern and the grey code pattern, and the well-known patterns in the field of displacement encoder, and in a lens, they are excellent in the following points in quantizing the lens information. (Of course, the present invention also permits the use of binary or grey code patterns.)

(1) In a binary code pattern or a grey code pattern, tracks corresponding to the number of bits of encoding must be prepared, whereas the code pattern of the M-sequences or the improved M-sequences can secure a number of bits necessary for the encoding by one track of code patterns and accordingly, when arranging such code pattern in a lens, the space occupied by it can be made smaller than the space occupied by the former code pattern and the reform of the conventional lenses can be simply accomplished.

(2) Being one track of code patterns, the code patterns of the M-sequences or the improved M-sequences are suited for the quantization of lens information obtained from a movable member having a relatively great angle of rotation such as the aperture ring or the distance ring.

(3) Since the code patterns of the M-sequences or the improved M-sequences are one track of code patterns, consideration need only be given to the direction of movement of the movable member (code pattern) for an error of the relative position between the code pattern and the reading means including the light-receiving element and there is a greater advantage in securing accuracy than that of the binary code pattern.

FIG. 5 shows another embodiment of the present invention. On the outer peripheral surface 8 of the aperture ring 2 of a lens, there are arranged photoelectrically legibly code-patterned numerals (for example, JIS-C6250: JIS stands for Japanese Industrial Standard). The code-patterned numerals are arranged correspondingly to the aperture value, as shown in FIG. 6, and are also visually legible. A light-receiving element 5' is divided into ten segments 10-19, each of which produces a photoelectric signal corresponding to the incident light. For example, a code pattern 8a projected and imaged on the light-receiving surface of the light-receiving element 5' by an optical system 6', 7' produces a distribution of the light and dark of the image on the light-receiving surface as shown in FIG. 7, and the output of each segment is converted into a digital signal by a comparator circuit as shown in FIG. 8, and is decoded by a decoder similar to that shown in FIG. 3. Subsequently, it is suitably processed as already explained in conjunction with FIG. 3. In providing on the aperture ring the code-patterned numerals as shown in FIG. 5, and where the number of figures of the aperture value is increased, for example, for f2 to f22, two sets of light-receiving elements 5' may be prepared so that the aperture value information may be obtained from the outputs of these two sets of light-receiving elements. Since such calligraphic style of figures is sufficiently visually legible, it is suited for the case as shown in FIG. 1 where there is no sufficient space available for both the code pattern and the ordinary scale to be provided. Further, as the object of the quantization of the lens information set value, distance, guide number or other fixed lens information may be selected in addition to aperture. It is also possible to make such a design that not only a bit of lens informtion but also a plurality of bits of lens information can be read. Also, in interchangeable lens groups, quantizing means for various kinds of set values can be provided at a low cost. A code plate can be simply added to the outside of the aperture values, etc. by alumite printing and thus, the reform of the conventional lens can be readily accomplished.

According to the present invention, the lens and the camera body are photoelectrically connected with each other and this eliminates the need to provide an electrical contact or a mechanical operating member as in the prior art, and there is provided a lens information introducing device of high reliability. Further, as compared with the conventional construction in which an optical system for observing the scale on the lens barrel is also provided on the camera body side, no special limitation is imposed on the location of the light-receiving element, that is, no special consideration need be given to the erect position, the inverted position and the visibility of the image and this leads to a very simple and inexpensive construction of the optical system itself. The electrical processing system connected with the light-receiving element can also be simply made into an IC by the existing technique and this means an advantage in terms of both space and cost.

I claim:

1. A lens information introducing device in a camera, comprising:
   n bits of code patterns provided on a lens, said patterns being photoelectrically legible;
   optical means for introducing said code patterns into a camera body and imaging the same at a predetermined position; and
   photoelectric converter means disposed at said predetermined position, said photoelectric converter means having n photoelectric converting elements corresponding to said code patterns and being effective to produce a digital electrical signal corresponding to the lens information on the basis of the photoelectric signals produced by said photoelectric converting elements.

2. The device according to claim 1, wherein said n bits of code patterns are provided on the outer surface of the lens.

3. The device according to claim 2, wherein said n bits of code patterns are provided on a movable member such as an aperture ring, a distance ring or the like and the imaging pattern by said optical means is varied by displacement of said movable member.

4. The device according to claim 3, wherein said n bits of code patterns are light and dark stripes.

5. The device according to claim 4, wherein said n bits of code patterns are one track of patterns comprising binary codes of M-sequences or improved M-sequences.

6. The device according to claim 3, wherein said n bits of code patterns are numerical patterns.

7. The device according to claim 4 or 5 or 6, wherein said photoelectric converter means has comparing means for comparing the output signals of said photoelectric converting elements with a signal of a predetermined level and generating one of two values in accordance with the magnitudes of said signals, and produces said digital electrical signal as the output of said comparing means.

8. The device according to claim 1, wherein the lens is removably mountable with respect to the camera body.

9. A lens for use with a camera body having an optical system for imaging a predetermined position of the outer peripheral portion of the lens within the camera body, and a processing device for reading the lens information by a signal from photoelectric converter means provided at the image forming position of said optical system, said lens including;
   n bits of code patterns provided at the predetermined position of the outer peripheral portion of the lens, said patterns representing the lens information.

10. The lens according to claim 9, wherein said n bits of code patterns are provided on a movable member such as an aperture ring, a distance ring or the like, and said code patterns lying at said predermined position are varied by displacement of said movable member.

11. The lens according to claim 10, wherein said n bits of code patterns are light and dark stripes.

12. The lens according to claim 11, wherein said n bits of code patterns are one track of patterns comprising binary codes of M-sequences or improved M-sequences.

13. The lens according to claim 12, further having a mount portion to enable the lens to be removably mounted to the camera body.

14. A device for reading code patterns in a camera using a lens provided with lens information as n bits of code patterns, said device including;
   optical means for introducing said code patterns into a camera body and imaging the same at a predetermined position; and
   photoelectric converter means disposed at said predetermined position, said photoelectric converter means having n photoelectric converting elements corresponding to said code patterns and being effective to produce a digital electrical signal corresponding to the lens information on the basis of the photoelectric conversion signals from said photoelectric converting elements.

15. The device according to claim 14, wherein said photoelectric converter means has comparing means for comparing the output signals of said photoelectric converting elements with a signal of a predetermined level and producing one of two values in accordance with the magnitudes of said signals, and generate said digital electrical signal as the output of said comparing means.

* * * * *